(12) United States Patent
Kampeman et al.

(10) Patent No.: US 8,239,962 B2
(45) Date of Patent: Aug. 7, 2012

(54) PROCESSING RIGHTS IN DRM SYSTEMS

(75) Inventors: Franciscus Lucas Antonius Johannes Kampeman, Eindhoven (NL); Milan Petkovic, Eindhoven (NL); Robert Paul Koster, Eindhoven (NL); Koen Hendrik Johan Vrielink, Eindhoven (NL)

(73) Assignee: Koninlijke Philips Electronics N.V., Eindhoven (NL)

( * ) Notice: Subject to any disclaimer, the term of this patent is extended or adjusted under 35 U.S.C. 154(b) by 1011 days.

(21) Appl. No.: 11/569,073

(22) PCT Filed: May 10, 2005

(86) PCT No.: PCT/IB2005/051518
§ 371 (c)(1),
(2), (4) Date: Nov. 14, 2006

(87) PCT Pub. No.: WO2005/111760
PCT Pub. Date: Nov. 24, 2005

(65) Prior Publication Data
US 2007/0226811 A1 Sep. 27, 2007

(30) Foreign Application Priority Data
May 17, 2004 (EP) .................................. 04102157

(51) Int. Cl.
*G06F 21/00* (2006.01)

(52) U.S. Cl. ............... 726/27; 726/7; 726/30; 713/156; 713/157; 713/175; 713/176; 705/59

(58) Field of Classification Search .................. 726/27, 726/30; 713/156, 157, 175, 176; 705/59
See application file for complete search history.

(56) References Cited

U.S. PATENT DOCUMENTS

| 7,320,140 | B1 * | 1/2008 | Boyer et al. ................ 726/6 |
| 7,487,363 | B2 * | 2/2009 | Alve et al. .................. 713/193 |
| 7,549,060 | B2 * | 6/2009 | Bourne et al. .............. 713/193 |
| 2002/0184517 | A1 * | 12/2002 | Tadayon et al. ............. 713/200 |

(Continued)

FOREIGN PATENT DOCUMENTS

EP 1509024 A2 * 2/2005

(Continued)

OTHER PUBLICATIONS

Heuvel Van Den, S.A.F.A. et al., "Secure Content Management in Authorized Domains", Int'l Broadcasting Convention, Sep. 15, 2002, pp. 467-474, XP002273504.

*Primary Examiner* — Vivek Srivastava
*Assistant Examiner* — Hee Song (57) ABSTRACT

This invention relates to a method of processing rights relating to content, that can be communicated between devices. Typically, a Digital Rights Management (DRM) system imposes limitations of use and distribution, imposed by the service provider, content provider or distributor. The method of the invention renders it possible for a user who has received DRM rights to restrict the right further. The invention is more particularly related to the receipt of DRM rights to Authorized Domain Digital Rights Management (AD-DRM) systems and the introduction of user attributed rights in the form of further restrictions introduced to the received DRM rights. The invention further relates to a Rights Program Template (RPT) facilitating the introduction of such further restrictions in a user friendly way. Finally, the invention relates to a system supporting the method of the invention.

24 Claims, 2 Drawing Sheets

U.S. PATENT DOCUMENTS

| | | |
|---|---|---|
| 2003/0018491 A1* | 1/2003 | Nakahara et al. .................. 705/1 |
| 2003/0028622 A1 | 2/2003 | Inoue et al. |
| 2003/0078891 A1 | 4/2003 | Capitant |
| 2003/0126086 A1 | 7/2003 | Safadi |
| 2006/0101521 A1* | 5/2006 | Rabinovitch .................... 726/26 |

FOREIGN PATENT DOCUMENTS

| | | |
|---|---|---|
| JP | 2003-178163 | 6/2003 |
| JP | 2004-133654 | 4/2004 |
| WO | 03014889 A2 | 2/2003 |
| WO | WO03034313 A3 | 4/2003 |
| WO | WO03098931 A1 | 11/2003 |
| WO | WO2004027588 A2 | 4/2004 |
| WO | WO2004038568 A2 | 5/2004 |
| WO | WO2004104899 A2 | 12/2004 |
| WO | WO2005010879 A2 | 2/2005 |
| WO | W02005093544 A1 | 10/2005 |
| WO | WO2005122467 A1 | 12/2005 |

* cited by examiner

PROCESSING RIGHTS IN DRM SYSTEMS

This invention relates to a method of processing rights in a Digital Rights Management (DRM) system, wherein DRM rights for controlling access to content have been created, the method comprising the step of receiving the DRM rights in the DRM system. The invention further relates to a Digital Rights Management (DRM) system, arranged to receive DRM rights for controlling access to content. Finally, the invention relates to a computer-readable medium having stored thereon instructions for causing a processing unit to execute the above method as well as a computer-readable medium having stored thereon a Rights Program Template (RPT) comprising associated data.

Recent developments in content distribution technologies (i.e. the Internet and removable media) make it easier to exchange content than ever before. The rapid adoption by consumers shows that such technologies really address their needs. A technology for managing access to digital content is Digital Rights Management (DRM) which is the digital management of rights and provides description, identification, trading, protection, monitoring and tracking of all forms of rights usages. DRM enables e.g. content providers, service providers and distributors to protect their content and maintain control over distribution. The content can be protected and/or managed by creating licenses for each piece of (digital) content. However, in the processing of DRM rights feasible today, end-users have no influence, and the processing of DRM rights therefore might seem inflexible to end-users and might not fulfil their needs.

Therefore it is an object of the present invention to provide a method of processing DRM rights providing an end-user with some influence.

This object, among others, is achieved when the method mentioned in the opening paragraph is characterized in that it further comprises the step of allowing a user of the DRM system to introduce user attributed rights in the form of further restrictions on the received DRM rights in the DRM system. Hereby, a user of a DRM system is able to add further restrictions/rights regarding the DRM rights, which are used to control the use of and access to content. The received DRM rights could e.g. be delivery DRM rights created by a distributor or a right owner, e.g. a service provider and/or content provider. The term "DRM rights" is meant to cover both "received DRM rights" and "user attributed rights". In the above and during this specification the term "user" is meant to cover the end-user, e.g. a person who is using content to which DRM rights relate.

The introduction by the user of the user attributed rights can be carried out on a device for accessing the content, to which the DRM rights relate, or on any other device, e.g. any networked computer device. Moreover, it is conceivable that user attributed rights could be downloaded from e.g. a website; such downloadable user attributed rights could be complete, so that the user doesn't have to adjust any parameters, or partial, so that the user attributed rights contain parameters, that can be adjusted, added and/or modified by the user.

Naturally, the further restrictions on the received DRM rights are only capable of limiting access to content and not to widening access to/use of content beyond the received DRM rights defined by the content provider/service provider/distributor. The introduction by the user of user attributed rights for imposing further restrictions on the received DRM rights in the DRM system can be carried out prior to, during, upon or after receipt of the DRM rights in the DRM system.

It should be noted, that the DRM system could enforce both the rights created by/originating from the service provider/ content provider/distributor, i.e. the received DRM rights, and the user attributed rights. It is preferred that the received DRM rights and the user attributed rights use the same mechanism (e.g. the same rights language, the same rights expression bits, same type of rights programs, etc.), because such combined mechanism improves efficiency and reduces complexity of the system architecture. However, it is also conceivable, that different mechanisms are employed under the control of the DRM system.

A special instance of a DRM system is the Authorized Domain Digital Rights Management (AD-DRM) system, which is a system performing the management of rights in an Authorized Domain. The Authorized Domain can be seen as an environment of devices, media, rights and users, where users and devices handle content according to the rights, but with a relative freedom if performed within the boundaries of the Authorized Domain.

Typically, an Authorized Domain defines a household with a home network and a number of users centred around the home network. Of course, other scenarios are possible, such as a company network. Moreover, a user could take a portable device for audio and/or video with a limited amount of content with him on a trip and use it in his hotel room to access or download additional content stored on his personal audio and/video system at home. Even though the portable device is outside the home network, it is a part of the user's Authorized Domain.

To meet content provider's and service provider's needs, exchange between different households and use of content should be controllable by a delivery DRM system. Typical restrictions laid down on imported content prior to the import thereof into an AD system could be restrictions on the number of times the content can be played, whether the content can be exported or not, a date after which the content no longer can be played, etc.

However, it is a drawback in current AD-DRM systems that the management of rights received in the Authorized Domain is determined solely by the content provider, service provider and/or distributor via the delivery DRM system. Therefore, it is a further object of the invention to provide an improved method of processing rights in an AD-DRM system, wherein one or more users of an Authorized Domain is/are provided with some influence.

This object is achieved, when the method according to the invention is characterized in that the DRM system receiving the DRM rights is an AD-DRM system, and where the method further comprises the step of, in the AD-DRM system, deriving Authorized Domain (AD) specific rights from the received DRM rights. Thus, a user in an Authorized Domain is able to add further restrictions/rights regarding the rights in an Authorized Domain Digital Rights management (AD-DRM) system by introducing the further restrictions; thereby the user in the Authorized Domain can prevent e.g. children of the household to access particular content to which they otherwise would have access, because they are members of the Authorized Domain, to which the content is related. Naturally, the further restrictions on the Authorized Domain (AD) specific right are only capable of limiting access to content and not to widening access to/use of content beyond the Authorized Domain (AD) specific right defined by the content provider/service provider/distributor.

Examples of such further restrictions could be: permission of which device(s) may be used to access a content, permission of which persons may access and how they may use a content, permission on time of use (e.g. not after a certain hour—possibly cross-referenced to a person), parental rating values, a specification of the persons, who are able to export the content to other authorized domains, a specification of the devices, which are able to export the content to other authorized domains, etc.

Preferably, the user is allowed to introduce the user attributed rights to the DRM rights upon or after receipt of the DRM rights. Thus, the user can introduce the user attributed rights subsequently to accessing and/or assessing content to which the DRM rights relate, so that he/she can introduce the further restrictions/user attributed rights, if he/she wants to e.g. prevent one or more of his/her children to access the content. It should be noted, that the above does not preclude the possibility that a user is allowed to introduce the user attributed rights before receipt of the DRM rights; this could e.g. be done via a web site (of the service provider) accessed via the Internet and this could be a way to ensure that the integrity of the user attributed rights is protected as integral part of the DRM rights protection.

In a preferred embodiment of the method according to the invention, the Authorized Domain (AD) specific rights are Cross Authorized Domain (X-AD) rights, which are arranged to control: (1) transfer of rights between Authorized Domains (AD) and (2) the access to the content in another Authorized Domain, i.e. after export to another Authorized Domain. Thus, a user of the AD-DRM system can further restrict any distribution of the content to which the X-AD right is related in addition to the restrictions in the DRM right received in the Authorized Domain. Examples of such restrictions could be a specification of the persons, who are able to export the content to other authorized domains, or of the devices, which are able to export the content to other authorized domains. Prior to or in the process of exporting, a user can also introduce limitations in a Cross Authorized Domain (X-AD) right with respect to the use of the content. These limitations will take effect in the Authorized Domain to which rights are exported.

In yet a preferred embodiment of the method according to the invention, the Authorized Domain (AD) specific rights are Authorized Domain (AD) rights, which have been derived from the Cross Authorized Domain (X-AD) rights, where the Authorized Domain (AD) rights are arranged to control access to content in an Authorized Domain (AD). Hereby, a user can introduce further restrictions on the use of content imported into the Authorized Domain and thus further control the use of content on the devices in the Authorized Domain. Examples of such restrictions could be: permission of which device(s) may use a content, permission of which persons may use a content and how they can use it, e.g. copy, play, permission on time of use (e.g. not after a certain hour—possibly cross-referenced to a person), parental rating values.

Above, it is described that user can introduce user attributed rights in the form of further restrictions on received DRM rights prior to, during, upon or after receipt of the DRM rights into the AD-DRM system. Thus, it is implied that a user, e.g. an authorized user who specifies the user attributed rights, is allowed to change or update the user attributed rights later on.

In yet a preferred embodiment of the method according to the invention, the Authorized Domain (AD) specific rights are Authorized Domain (AD) rights, which have been derived from the Cross Authorized Domain (X-AD) rights, where the Authorized Domain (AD) rights are arranged to control access to content in an Authorized Domain (AD) and where a user has already introduced further restrictions on the Cross Authorized Domain (X-AD) right. Thus, a user can introduce restrictions regarding any distribution of the content to which the X-AD right is related to other Authorized Domains as well as restrictions regarding use of content imported into the Authorized Domain and thus the use of content on the devices in the Authorized Domain.

Even though a distinction is made in the above between X-AD rights and AD rights, it should be noted that for the most part the treatment of the two types of rights are the same. One example is when a DRM right, e.g. a delivery DRM right, is received in the Authorized Domain and an X-AD right is derived from the received DRM right. When a user specifies user attributed rights for this X-AD right, the resulting right preferably is used to derive AD rights without the user needing to specify more restrictions; instead the AD right is constructed on the basis of the X-AD rights plus the user attributed rights in the form of further restrictions added to said X-AD rights.

In a preferred embodiment of the method according to the invention, the user attributed rights and the received DRM rights constitute two sets of rights that are linked together. Thereby the two sets of rights are enforced together. Such a link can be provided by a logical link using identifiers or a cryptographic link (e.g. by encrypting a right in the first set with a key that is stored in a right in the second set of rights). Alternatively, the user attributed rights are introduced by modifying the received DRM rights. This provides two different ways of carrying out the further restrictions, imposed on received rights, by a user. For example, the rights can be changed in the process of receipt, e.g. delivery DRM rights into AD DRM rights. Another possibility is in the process of deriving AD rights from X-AD rights. In both cases the AD-DRM system will make sure that the rights include further restrictions specified by user, where said rights are obtained by transforming rights in the process of receiving (e.g. from delivery DRM rights or X-AD rights to AD DRM rights). In the case that the delivery DRM system is also an AD-DRM system, the user will be able to add restrictions as additional rights, which will be coupled to the original rights by different means as described below.

If the Authorized Domain Digital Rights Management (AD-DRM) system supports complex or advanced rights, it might be difficult for a user to specify further restrictions on an Authorized Domain (AD) specific right received in the AD-DRM system. Typical ways of letting a user specify further restrictions on an AD specific right could be to let the user write a rights program restricting the AD specific right, to let the user assign a predefined rights program, where such a rights program is executed in the context of the AD-DRM system through an embedded virtual machine. However, the former possibility is complex and cumbersome for the user and the latter possibility is inflexible.

Therefore, it is preferred if the method according to the invention further comprises the step of accessing a Rights Program Template (RPT) comprising associated data, and wherein the step of introducing user attributed rights to a received DRM right is performed by using the Rights Program Template (RPT). The Rights Program Template (RPT) can offer a balance between complexity and flexibility for the user. For example, an RPT could be downloaded via the Internet, could be transferred via BlueTooth or IR or could be resident on a device in the Digital Rights Management (DRM) System.

The step of using the Rights Program Template (RPT) for introducing further restrictions on a received DRM right in the method according to the invention is preferably performed by adjusting the data associated with the Rights Program Template (RPT). Hereby, a user can be provided with a user friendly way of introducing further restrictions on the rights regarding the access to content imported into the Digital Rights Management (DRM) System. The Rights Program Template could present the associated data to the user and provide him/her with the possibility to adjust them.

Moreover, the Rights Program Template (RPT) could comprise associated data containing fixed data and template data, whereof only the template data can be adjusted by a user. This contributes to the user friendliness of the Rights Program Template (RPT). Typically, the fixed data cannot be changed, whereas the template data can be adjusted or set by the user. Templates could be produced by content providers, by users of the Digital Rights Management (DRM) system or others.

The invention furthermore relates to a Digital Rights Management (DRM) system with features corresponding to the method described above and thus representing similar advantages.

As noted above, the term "Authorized Domain" is meant to cover an environment of devices, media, rights and users, where users and devices can handle content according to the rights, and typically the term defines an environment, such as a household or a company, inside which content can be relatively freely used, but which limits the crossing of content across its border. The term "media" is meant to cover everything on which digital information/content can be stored. Devices can have built-in storage (media), e.g. a hard disk drive, or can employ removable media, such as optical discs. The term "right" expresses what can be done with the content and the term "content" covers an item, such as a piece of music, a film, a computer program, etc. The term "user" is meant to cover a person, who is able to operate devices and the term "device" is meant to cover equipment or a hardware component with processing and/or storage capabilities and capabilities to perform operations on digital information/content. Moreover, an "AD-DRM system" is a DRM system with a grouping concept added to it for devices and/or users. The architecture can be more or less the same as a DRM system, but with support for the AD concept added.

As mentioned, the term "DRM rights" is meant to cover both "received DRM rights", "delivery DRM rights" and "user attributed rights", where "delivery DRM rights" denote DRM rights created by or distributed by a content or service provider or a distributor. Since an Authorized Domain is a special instance of a DRM system, the term "DRM rights" is also meant to cover AD rights and X-AD rights, and X-AD rights delivered from a service or content provider or distributor is a special instant of received DRM rights. Finally, it should be noted that even though the terms "DRM rights", "AD rights" and "DRM rights" are in plural form, this is only due to grammatical reasons; thus these terms are not necessarily limited to a plurality of rights.

Moreover, the terms regarding a step performed "in an AD-DRM system" and "in a DRM system", respectively, are intended to mean that the step is performed on a device, that implements or supports an AD-DRM system and a DRM system, respectively, or that the step is part of a process or method being part of an AD-DRM system and a DRM system, respectively. Finally, the phrasing "receive DRM rights" is meant to cover any way in which DRM rights can be received, imported or obtained from a DRM right system.

The invention will be explained more fully below in connection with a preferred embodiment and with reference to the drawing, in which.

Figure 1:
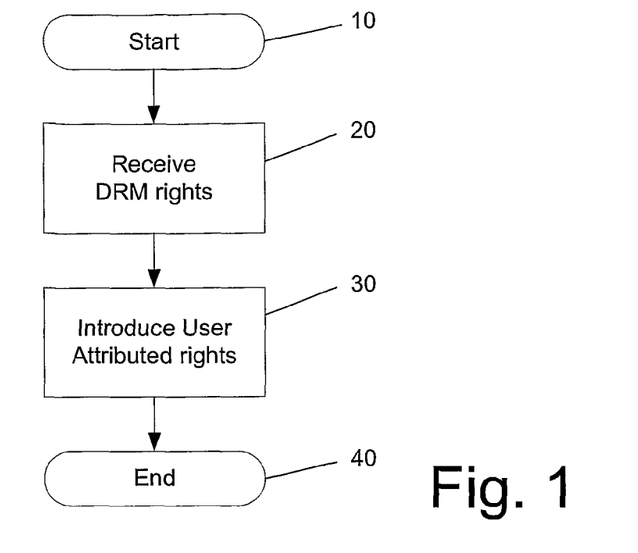
FIG. 1 is a flow chart of the method of the invention.

FIG. 1 is a flow chart of the method of the invention. The method is carried out in a DRM system. The chart starts in 10 succeeded by step 20, wherein DRM rights are received in the DRM system. The DRM rights could e.g. have been created by a content provider, service providers or a distributor to protect their content and maintain control over distribution. Before, during, upon or after reception of the DRM rights, a user can introduce user attributed rights in the form of further restrictions on the DRM rights in the DRM system, step 30. An example of introduction of the user attributed rights before reception of the DRM rights could be by means of an Internet service for introducing the user attributed rights before downloading of digital content to a device, which supports or implements the DRM system via the Internet. An example of introduction of the user attributed rights upon or after reception of the DRM rights could be by introducing the user attributed rights via a device, which implements or supports the DRM system, by a user after import of content to the device or to a home network, which the device is a part of. Thus, a user could import content coupled to DRM rights and, after accessing and assessing the content, introduce restrictions on the access thereto. The flow ends in step 40.

Figure 2:
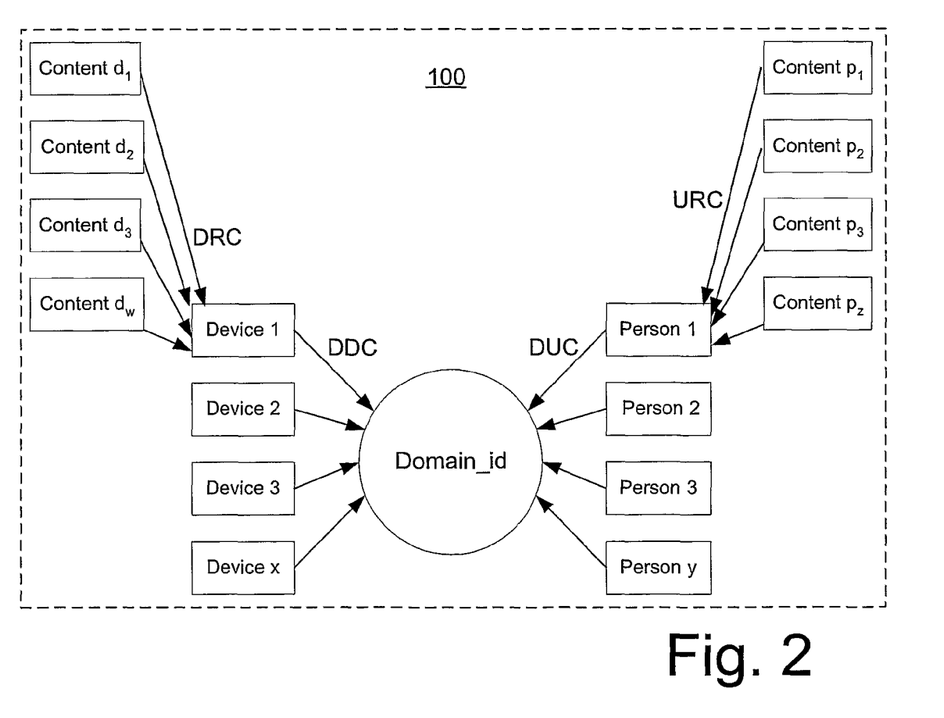
FIG. 2 is a schematic representation of a hybrid person and device based Authorized Domain Digital Rights Management (AD-DRM) system.

FIG. 2 is a schematic representation of a hybrid person and device based Authorized Domain Digital Rights Management (AD-DRM) system 1000, which is an example of a preferred embodiment of an AD-DRM system for use in the invention. FIG. 2 shows content, devices and persons relating to the same AD-DRM system. In this hybrid AD-DRM system 100 content (content $p_1$, content $P_2$, content $p_3$, content $p_z$ (where z is equal to or larger than 1)) is coupled to a specific person (Person 1 in FIG. 2) and persons (Person 1, Person 2, Person 3, Person y (where y is equal to or larger than 1)) are coupled to a Domain Identifier (Domain_Id). Moreover, content (content $d_1$, content $d_2$, content $d_3$, content $d_w$ (where w is equal to or larger than 1)) can be coupled to one or more devices (Device 1 in FIG. 2) and the devices (Device 1, Device 2, Device 3, Device x (where x is equal to or larger than 1)) are coupled to the same Domain Identifier (Domain_Id), so that the different devices, persons and content are mutually coupled. In the AD-DRM system 100 shown in FIG. 2 content can be coupled to persons or directly to devices. The hybrid AD-DRM system shown in FIG. 2 reflects the ownership of content, so that identification of a person, to which the content belongs, and thus of who is allowed to manipulate the content, can be achieved easily. Alternatively, the content could be coupled directly to the Domain Identifier.

Grouping and coupling of devices, persons and content are performed by means of certificates, whereof Domain Devices Certificates (DDC) couple devices to the Domain; Domain Users Certificates (DUC) couple persons to the Domain; User Right Certificates (URC) couple content to persons/users and Device Right Certificates (DRC) couple content to devices. The DDC lists the devices, which are part of the domain and the DUC lists the users, who are part of the domain. The DDC and DUC are associated with each other by means of the Domain Identifier (Domain_id), which is contained in both certificates.

Whenever access to content is demanded in the AD-DRM system shown in FIG. 2, it has to be proven by means of the certificates that access is authorized. This can be the case, e.g. if the content is coupled to a person, who is a member of the same domain as the device, if the content is coupled to a device, that is a member of the same domain, or if a user belonging to the domain is authenticated to the device, even when the content is bound to another user of the same domain, regardless of which domain the device is bound to.

Issues regarding devices entering into or leaving the AD-DRM system and users joining and/or leaving the Authorized Domain are beyond the scope of this description as well as issues on how persons and/or devices are identified (such as identifying persons on the basis of e.g. biometric data or smartcards or identifying devices).

The above choice for a hybrid AD-DRM system is merely illustrative. Different concepts and proposals exist that implement authorized domains. In so-called device based ADs, the domain is formed by a specific set of devices and content. A domain manager, which can be one or more of the devices, a smart card or another device, controls which devices may join the domain. Only the specific set of devices of the domain is allowed to make use of the content of that domain, e.g. to open, copy, play or export it. Examples of such device-based ADs are given in international patent application WO 03/098931 and international patent application WO 04/027588 by the same applicant.

Another type of AD is the so-called person based Authorized Domain, where the domain is based on persons instead of devices. An example of such a system is described in international patent application WO 04/038568 by the same applicant, in which content is coupled to persons, which then are grouped into a domain.

A so-called Hybrid Authorized Domain-based DRM system ties content to a group that may contain devices and persons. In such a hybrid system, content can be watched on any of the devices that belongs to the group. In addition, content can be watched by any of the persons that belong to the group on any device after they have authenticated themselves on that device. Such authentication normally involves a user authentication device such as a smart card. Examples of hybrid AD systems can be found in international patent application serial number PCT/IB2004/051226 and in European patent application serial number 04101256.8.

Figure 3:
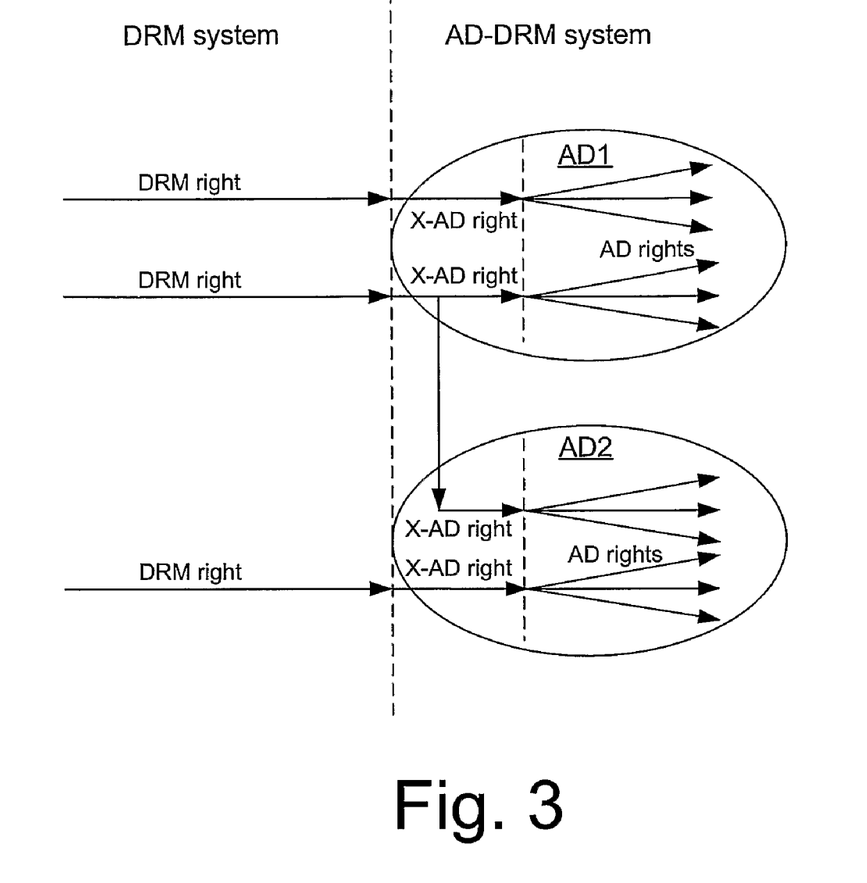
FIG. 3 is a schematic representation of an example of transcoding of rights.

FIG. 3 is a schematic representation of an example of transcoding of rights. The part to the left of the vertical dashed line represents a delivery Digital Rights Management (DRM) system that can provide delivery DRM rights to an Authorized Domain Digital Rights Management (AD-DRM) system. The delivery DRM rights are related to content and represent the permissions of the service provider, e.g. how many times the content can be played, if the content may be copied, etc. Upon receipt of the delivery DRM rights in the AD-DRM system, the delivery DRM rights are converted to an Authorized Domain (AD) specific right that relates to the specific Authorized Domain, i.e. the persons, devices in the Authorized Domain. In the example shown in FIG. 3, the Authorized Domain (AD) specific rights cover both Cross Authorized Domain (X-AD) rights and Authorized Domain (AD) rights, where the DRM right upon receipt in the AD-DRM system is converted into an X-AD right that is used to control exchange of content and rights among different Authorized Domains and the accessing the content in other Authorized Domains (i.e. in domains different from the Authorized Domain, whereto the right/content is bound). AD-rights are derived from X-AD rights in an Authorized Domain. AD rights are for use within the authorized domain only. Thus, an X-AD right can be exported from an Authorized Domain (AD1) to another Authorized Domain (AD2) using the same or an analog kind of an AD-DRM system, and from the X-AD right received in the Authorized Domain AD2, AD rights relating to the access to content in AD2 can be derived.

The invention provides the possibility that a user can restrict the X-AD rights, the AD-rights or both. Such restrictions could relate to:

Permission of which device can access content
Permission of which persons can access content
Permission how a person can use content (e.g. play a number of times)
Permission of time of use, e.g. "not after 10 o'clock" (cross referenced to a person)
Parental rating values
Permission of who can export content to other authorized domains.

When AD rights have been derived from an X-AD right that couples content to one or more devices or persons, rights specifying the one or more devices or persons, which/who can access the content, are derived from the X-AD right in a way that the effect thereof regarding the use of/access to content in the Authorized Domain is maintained.

When content is exported from one Authorized Domain to another, an X-AD right related thereto can be restricted further by a user by means of the invention. In this way the user adds additional restrictions to the delivery DRM rights defined by the service provider.

For more information on X-AD rights, see international patent application WO 03/098931.

Typically, the user who defines the user attributed rights in the form of further restrictions regarding access to content in an Authorized Domain is the user, who bought the content or alternatively a person belonging to the Authorized Domain and serving as the administrator of the Authorized Domain.

In the following, two examples are given, whereof the first example demonstrates the deriving of an X-AD right from a delivery DRM right where extra restrictions are added and the second example demonstrates a restriction of an AD right regarding the persons and devices having access to content related to the AD right.

EXAMPLE 1

Delivery DRM right={ContentID, Play=CopyOnce={Persons={All}, Devices={$D_1$, $D_2$, $D_3$}}}→X-AD right={ContentID, Play={Persons={All}, Devices={$D_1$, $D_2$, $D_3$}}, CopyOnce={Persons={$P_1$}, Devices={$D_1$, $D_2$, $D_3$}}, Move={Persons=$P_1$}}}, The arrow "→" denotes "is converted to", $D_i$ and $P_j$ denote a specific device and a specific person, respectively. The example shows the derivation of an X-AD right from a delivery DRM right (i.e. the conversion of a delivery DRM right to an X-AD right), with the simultaneous introduction of user attributed rights. The delivery DRM right supports that content with content identification "ContentID" can be played and copied once by all persons and to any of the devices $D_1$, $D_2$ or $D_3$. A user has added restrictions (before, after or during derivation to an X-AD right), so that the content with content identification "ContentID" can only be copied or moved outside the domain by the person $P_1$. The format of the rights might contain additional fields; however, they are not shown for brevity reasons.

EXAMPLE 2

X-AD right={ContentID, Play={Persons={All}, Devices={$D_1$, $D_2$, $D_3$}}, CopyOnce={Persons={$P_1$}, Devices={$D_1$, $D_2$, $D_3$}}, Move={Persons={$P_1$}}}→AD right={ContentID, Play={Persons={$P_1$, $P_2$}, Devices={$D_1$, $D_2$}}}

The example shows the derivation of an AD right from an X-AD right, with the simultaneous introduction of user attributed rights. In this example, the user restricts the set of persons who can play the content to only persons $P_1$ and $P_2$ and the set of devices, on which content can be accessed by the devices $D_1$ and $D_2$. The rights "CopyOnce" and "Move" are not relevant in an AD right, in that they are not relevant for the use of content in the Authorized Domain. Therefore, they are omitted in the AD right in this example.

Even though the above examples and FIG. 3 regard delivery DRM rights, it should be understood, that any received equivalent examples could be described relating to any DRM right, such as an AD right or an X-AD right.

Figure 4A:
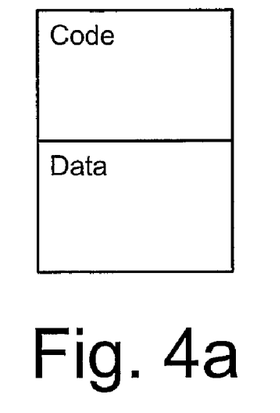
FIGS. 4a and 4b show schematic representations of Rights Program Templates (RPT).
Figure 4B:
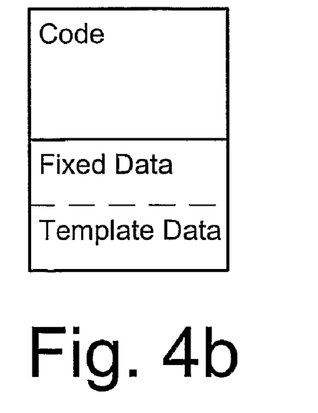

FIGS. 4a and 4b show schematic representations of Rights Program Templates (RPT), which can be used for implementing the introduction of further restrictions on rights according to the invention.

It is presumed that rights expressions in the rights management part of the AD DRM system are in the form of executable rights applications, and that such executable rights applications are also used in the DRM system delivering rights to the AD DRM system. In this example of an embodiment of the invention rights are Rights Program Templates (RPT) having associated data and associated code, see FIG. 4a. Such RPTs can be executed in the context of the AD-DRM system through an embedded virtual machine. The code contains a program, that export methods, e.g. a method "validateAccess( )" indicating whether content can be accessed. The data contains data used by the program, e.g. strings, constants, etc.

In a rights program template (RPT) issued by a content provider, the code segment of the RPT could verify in its method "validateAccess( )", that the content may be accessed between two specific dates only. Those dates could be contained in the data segment of the RPT.

According to the invention, the data segment of the RPT contains fixed data as well as template data, whereof only the template data are adjustable by a user. The code segment of the RPT is fixed.

Table 1 below illustrates how the principle of template data can be used in practice. The fixed data are not shown in the table. A user can set the elements in the column "Template data" (the variables) to any valid value of the variable.

Table 1 illustrates how the principle of template data in the RPT can be used in practice. The column "Pseudo Code" of table 1 illustrates the pseudo code of a RPT executed for a content access operation. It is foreseen that a representation of the AD right or the X-AD right could be made available to the user for indication of the permissions/restrictions set by the RPT, typically, but not necessarily limited to, the user attributed rights introduced. The variables in the template data might play a role in the permissions/restrictions set by the RPT and therefore a textual representation of the AD right or the X-AD right is proposed, where the textual representation is also based on the variables in the column "template data". For e.g. parental control such a textual representation might be (pseudo code):

```
GetRightsIndicationsText(action)
{      switch(action)
           case "access"
               return "Access allowed if user is older than" + <age_limit>
           case " . . . "
               . . .
}.
```

It should be noted that the Rights Program Template (RPT) can be downloadable from service providers, content providers or other entities to those devices in the AD-DRM system that comprise a user interface. Alternatively, the RPT can be a default template on a device or possibly written by a user.

A user can decide to assign an available RPT to content, to which he/she has some rights. The RPT can be shown to the user in a form similar to the column "Description" in Table 1 or by a "GetRightsIndicationsText( )" in the RPT. This can be performed on the user interface of a device in the AD-DRM system or on a webpage of a service or content provider offering the RPT.

The user might adjust values for the parameters set in the RPT. Naturally, the possible values of the variables must be predefined (e.g. to be a natural number, a user, a user name, a device, an action). The predefinition of the possible values could be contained in the fixed data of the RPT. The changes made by the user by choosing values in the RPT can be fed

TABLE 1

| Template name | Description | Pseudo Code | Template data |
|---|---|---|---|
| Parental control | Content may be accessed by people above a certain age limit <age_limit> | Allow access if getAge(getAuthPerson( )) ≧ <age_limit> | <age_limit> |
| Community Sharing | Content may be accessed by people belonging to community <community_id> | Allow access if <community_id> is member of getCommunities(getAuthPerson( )) | <community_id> |
| ACl | Certain actions are allowed for certain people | Allow action if <action> in <action_list> and <action_permissions [getAuthPerson( )] is true | <action> <action_list> <action_permissions> |
| Combination templates | Content may be accessed if certain other rights are true (e.g. people above an age limit and belonging to a community can access the content) | Allow if each invocation of <profile_instances[x] > is true | <Profile_instances[x]>, e.g. Profile_instances[0] = "parental_control_above 16", Profile_instances[1] = "community_sharing_bridgeclub" | back to him/her so that he/she can adjust the RPT until he/she is satisfied. Finally, the user should bind the rights provided by the RPT to the content.

In the following, the different ways of coupling delivery DRM rights and the X-AD rights derived at the receipt of the delivery DRM rights in an Authorized Domain are described.

Delivery DRM rights issued by a service provider/content provider/distributor are typically protected in such a way that the integrity and origin of the rights can be verified, e.g. the rights are signed by a signature which prevents unauthorized alterations. Such a signature typically also prevents the rights from being modified and thus prevents the user attributed rights from being incorporated in the delivery DRM rights. When the delivery DRM rights are transferred into X-AD rights, these X-AD rights may be translated to the appropriate format and again the integrity and origin of the resulting X-AD rights must be protected. This could be done by letting the receiving device sign the resulting X-AD rights. Also in this case the rights cannot be simply be modified later on to take user attributed rights into account.

The following options exist when a user wants to introduce user attributed rights to existing delivery DRM rights or X-AD rights. The user attributed rights could simply exist next to the service or content provider attributed right, i.e. the delivery DRM rights or the X-AD rights. The user attributed rights should also be protected; this can typically be done by signing the user attributed rights by the user that defines the rights or by the device that is used to perform this operation (assuming that the device is compliant and only allows a user that is bound to the content to specify a user attributed right).

However, the presence of two types of rights (i.e. delivery DRM rights and user attributed rights) next to each other as proposed above is not considered as good practice security-wise. It is preferred to have a coupling between the two types of rights, such that one of the rights cannot simply be removed to fool the system. Possible ways of coupling could be:

- When a service or content provider or distributor generates a delivery DRM right, he/she also puts in the user attributed rights, which the user has informed him/her to add. However, this is not a very common scenario, because the user could not change anything later on. However, it would result in one DRM rights object with one signature.
- During receipt of a delivery DRM right, X-AD rights are created by a compliant AD device which could put the user attributed rights next to the delivery DRM rights created by the service or content provider or distributor and make it one DRM rights object with one signature.
- During receipt of a delivery DRM right, X-AD rights derived from the delivery DRM rights could be modified in such a way that is guaranteed that the X-AD rights only becomes more restricted and effectively implements the user attributed rights.
- The delivery DRM rights created by the content or service provider or distributor or a derivation thereof, i.e. the X-AD rights, could be embedded in the user attributed rights as a whole forming one rights object that links the two types of rights together. Either the user or device could sign the resulting object.
- The X-AD rights containing a derivation of the delivery DRM rights are encrypted with a key that is stored in the user attributed rights; hereby a cryptographic link between the X-AD rights and the user attributed rights can be created, which requires that during an access to the content, to which the rights relate, access to the user attributed rights as well as to the derived X-AD rights is required.

Even though it has been described how the RPT are used in connection with rights received from a DRM system, it is also conceivable, that the RPT can be used in connection with content made or composed by a user. Thus, no DRM right is inherently related to the content, but the user can apply the RPT to impose right management of the content whenever the content is exported or communicated.

As discussed above, in an embodiment the user attributed rights further restrict exercise of the received DRM rights to certain persons. To this end information that only certain persons in an authorized domain are allowed to use the content can be introduced in the DRM system, preferably by adding them to an existing DRM right. These persons then usually need to authenticate themselves with a smart card before they can use the content. In certain situations, however, using a smart card may not be perceived as user friendly. On the other hand this type of access control is desirable, e.g. to protect children from violent movies.

To address this issue, instead of only indicating the persons during addition of e.g. privacy attributes it is possible to attach person-identifying data, such as biometric data, or a PIN code to content. The type of person-identifying data may be chosen depending on the security level required. This has the advantage that privacy attributes can be attached and used in a more user-friendly way.

An alternative is that user identification data is contained in a different object. This object may be referenced from the privacy attributes.

Taking the second example above as a starting point, the above-mentioned user-friendly option can be implemented by adding to $AD_{right}$ a field such as Required_Person_id=<biometric_template>. The item <biometric_template> represents biometric data or information that can be verified using a biometric measurement.

For instance, in international patent application WO 04/104899 and European patent applications having serial number 04102609.7 and 04104386.0 a process of enrolment and authentication using biometric data is disclosed. In this process, a reference biometric measurement X is taken from the person involved. The measurement X is translated into a secret S. Helper data W is computed such that a later biometric measurement Y can be transformed reliably into this secret S. Applying this technique to the present invention means that the values W and S can be stored as the biometric template. Preferably a cryptographically hashed version of S is stored instead of S itself.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In the system claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of processing DRM (Digital Rights Management) rights in a Digital Rights Management (DRM) system, wherein DRM rights for controlling access to content have been created, the method comprising:
receiving the DRM rights in the DRM system, and
allowing a user of the DRM system to directly input user attributed rights via a user interface in the form of further restrictions on the received DRM rights to regulate the DRM system without external authorization, the further restrictions implemented via a Rights Program Template (RPT) that imposes rights management of the content when the content is exported or communicated,
allowing the user of the DRM system to adjust template data associated with the Rights Program Template via the user interface, wherein the Rights Program Template comprises said template data and fixed data, whereby only the template data is adjustable by the user,
wherein the DRM system receiving the DRM rights is an AD-DRM system which derives Authorized Domain (AD) specific rights from the received DRM rights
wherein the received DRM rights and the user attributed rights are coupled rights preventing the removal of only one of the received DRM rights or the user attributed rights.

2. The method according to claim 1, wherein the user is allowed to introduce the user attributed rights to the DRM rights upon or after receipt of the DRM rights.

3. The method according to claim 1, wherein the Authorized Domain (AD) specific rights are Cross Authorized Domain (X-AD) rights, which are arranged to control transfer of rights between Authorized Domains (AD) and the access to the content in other Authorized Domains.

4. The method according to claim 1, wherein the Authorized Domain (AD) specific rights are Authorized Domain (AD) rights, which have been derived from a Cross Authorized Domain (X-AD) rights, where the Authorized Domain (AD) rights are arranged to control access to the content in an Authorized Domain (AD).

5. The method according to claim 2, wherein a user has introduced user attributed rights to a Cross Authorized Domain (X-AD) rights.

6. The method according to claim 1, wherein the user attributed rights and the received DRM rights form two sets of rights that are linked together.

7. The method according to claim 1, wherein the user attributed rights are introduced by modifying the received DRM rights.

8. The method according to claim 1, wherein the Rights Program Template (RPT) comprises associated data, and wherein the introducing the user attributed rights to a received DRM right is performed by using the rights program template (RPT).

9. The method according to claim 8, wherein the using the rights program template (RPT) for introducing the user attributed rights to a received DRM right is performed by adjusting the data associated with the Rights Program Template (RPT).

10. The method according to claim 1, wherein the user attributed rights restrict exercise of the received DRM rights to certain persons.

11. The method according to claim 10, wherein the user attributed rights contain person-identifying data to indicate the certain persons.

12. A Digital Rights Management (DRM) system arranged to receive DRM rights for controlling access to content, the system comprising:

a processor operable to allow a user of the DRM system to directly input user attributed rights in the form of further restrictions on received DRM rights to regulate the DRM system without external authorization, the further restrictions implemented via a Rights Program Template (RPT) that imposes rights management of the content when the content is exported or communicated,
allowing the user of the DRM system to adjust template data associated with the Rights Program Template via the user interface, wherein the Rights Program Template comprises said template data and fixed data, whereby only the template data is adjustable by the user,
wherein the DRM system receiving the DRM rights is an AD-DRM system which derives Authorized Domain (AD) specific rights from the received DRM rights;
wherein the received DRM rights and the user attributed rights are coupled rights preventing the removal of only one of the received DRM rights or the user attributed rights.

13. The DRM system according to claim 12, wherein the DRM system arranged to receive DRM rights is an AD-DRM system, and in the AD-DRM system, the processor is operable to derive an Authorized Domain (AD) specific right from the received DRM rights.

14. The DRM system according to claim 13, wherein the Authorized Domain (AD) specific rights are Cross Authorized Domain (X-AD) rights, which are arranged to control transfer of rights between Authorized Domains (AD) and the access to the content in other Authorized Domains.

15. The DRM system according to claim 13, wherein the Authorized Domain (AD) specific rights are Authorized Domain (AD) rights, which have been derived from a Cross Authorized Domain (X-AD) rights, and the Authorized Domain (AD) rights are arranged to control access to the content in an Authorized Domain (AD).

16. The DRM system according to claim 13, wherein the Authorized Domain (AD) specific rights are Authorized Domain (AD) rights, which have been derived from a Cross Authorized Domain (X-AD) rights, the Authorized Domain (AD) rights are arranged to control access to content in an Authorized Domain (AD) and a user has introduced user attributed rights to the Cross Authorized Domain (X-AD) rights.

17. The DRM system according to claim 12, wherein the processor is operable to link the user attributed rights and the received DRM rights together.

18. The DRM system according to claim 12, wherein the processor is operable to introduce the user attributed rights by modifying the received DRM rights.

19. The DRM system according to claim 12, wherein the Rights Program Template (RPT) comprises associated data, such that the user attributed rights can be introduced to a received DRM right by using the rights program template (RPT).

20. The DRM system according to claim 19, wherein the DRM system comprises means for adjusting the data associated with the Rights Program Template (RPT) for introducing the user attributed rights to a received DRM right.

21. The DRM system according to claim 12, wherein the user attributed rights further restrict exercise of the received DRM rights to certain persons.

22. The DRM system according to claim 21, wherein the user attributed rights contain person-identifying data to indicate the certain persons.

23. A non-transitory computer-readable medium having stored thereon instructions for causing a processing unit to execute the acts comprising:

creating DRM (Digital Rights Management) rights in a Digital Rights Management (DRM) system for controlling access to content; receiving the DRM rights in the DRM system;

allowing a user of the DRM system to directly input user attributed rights in the form of further restrictions on the received DRM rights to regulate the DRM system without external authorization, the further restrictions implemented via a Rights Program Template (RPT) that imposes rights management of the content when the content is exported or communicated;

allowing the user of the DRM system to adjust template data associated with the Rights Program Template via the user interface, wherein the Rights Program Template comprises said template data and fixed data, whereby only the template data is adjustable by the user, wherein the DRM system receiving the DRM rights is an AD-DRM system which derives Authorized Domain (AD) specific rights from the received DRM rights, wherein the received DRM rights and the user attributed rights are coupled rights preventing the removal of only one of the received DRM rights or the user attributed rights.

24. The non-transitory computer-readable medium according to claim 23, further comprising instructions, when executed, to store the Rights Program Template (RPT) comprising associated data.

* * * * *